United States Patent [19]

Kouno

[11] Patent Number: 4,808,430
[45] Date of Patent: Feb. 28, 1989

[54] METHOD OF APPLYING GEL COATING TO PLANT SEEDS

[75] Inventor: Yasushi Kouno, Susono, Japan

[73] Assignee: Yazaki Corporation, Tokyo, Japan

[21] Appl. No.: 154,358

[22] Filed: Feb. 11, 1988

[30] Foreign Application Priority Data

Feb. 27, 1987 [JP] Japan .................................. 62-043150
Jun. 18, 1987 [JP] Japan .................................. 62-150243

[51] Int. Cl.⁴ ........................ A01G 5/06; A01N 1/00; B05D 3/12
[52] U.S. Cl. ........................ 427/4; 427/350; 427/398.1
[58] Field of Search ............ 427/4, 350, 398.1

[56] References Cited

U.S. PATENT DOCUMENTS 4,657,773  4/1987  Mueller .................... 427/4

FOREIGN PATENT DOCUMENTS

48-85311  11/1973  Japan .
54-49807  4/1979  Japan .
55-3796  1/1980  Japan .
56-20409  2/1981  Japan .

*Primary Examiner*—Michael Lusignan
*Attorney, Agent, or Firm*—Armstrong, Nikaido, Marmelstein & Kubovcik

[57] ABSTRACT

A new method of processing a plant seed wherein a coating treatment is applied to a plant seed with an aqueous alkali salt solution of an aqueous gel to form a coating layer thereon and said coating layer is reacted with an aqueous solution of a divalent or trivalent metal salt to render the coating layer insoluble to water. Particularly, the improvement is accomplished by encapsulating the plant seed in the above mentioned gel coating together with an air bubble. This encapsulation is performed by means of a nozzle having a telescopic structure, in which a plant seed and air is supplied through the inner passage while the gel is supplied the surrounding annular passage. The nozzle is used in a vertical orientation and the lower end performs a valve function to control the gel supply.

3 Claims, 4 Drawing Sheets

METHOD OF APPLYING GEL COATING TO PLANT SEEDS

BACKGROUND OF THE INVENTION

The present invention concerns an improvement for a method of applying gel-coating to seeds of plants.

Seeds of plants (hereinafter simply referred to as seeds) have generally been directly seeded in a field, or previously seeded in a nursery. In the case of sowing them in the nursery, seedlings raised to a certain extent in the nursery are transplanted to the field. In the case of the direct sowing, seeds are liable to suffer from disease injury through sowing. In addition, if the grain size of seeds is so small as in the case of salad seeds for instance, they are often washed away upon rainfall or watering. Furthermore, in the case of the direct sowing, since the seeds are present near the surface soil, they are often damaged being eaten by birds or other animals and, accordingly, development for special techniques has been demanded in recent years as countermeasures therefor.

Recently, machine sowing has often been employed in place of hand-sowing for the reason that hand-sowing requires thinning after the growth of plants and often hinders uniform growing of the plants. However, many restrictive factors are present in the machine sowing and the main factors can include, for example, that seeds are large in size, spherical in shape as much as possible and also uniform in shape regarding an identical kind of seeds and have no peripheral flagellum or arista. Accordingly, all kinds of seeds are suitable to the machine sowing and, for example, those seeds such as of carrot and spinach have to be seeded by hand-sowing in view of their shapes. In addition, it is difficult to sow seeds each by three to four grains even in the machine sowing. Further, since only the stripe sowing is possible in the conventional device, thinning work is unavoidable, which requires much labour as the administrating operation after sowing.

In addition, for the prevention of the diseases injury as one of the countermeasures described above, there have been known a method of immersing seeds in a chemical solution, a method of adhering chemical dressing to the surface of the seeds and a method of applying dry heating treatment. However, the former two methods are not quite satisfactory having the drawbacks that the chemicals do not sufficiently penetrate to the inside of the seeds or the dressing is liable to be defoliated. Further, the latter method involves a problem of the applicability depending on the heat resistant nature of seeds and, if the application conditions are not appropriate, the seeds may be killed.

Further, as the countermeasure for the washaway and damage by the animal eating of the seeds, it has been known to apply a coating material to the surface of seeds thereby increasing the grain size larger into a so-called coated seeds. Since the coated seeds enables easy and accurate machine or hand-sowing, as well as enables the addition of germicide, insecticide, animal repellent, nutrient agent (fertilizer), etc. to the coating material, there have been made various studies and proposals for coated seeds in recent years.

As the basic material for the seed coating, there have been known clays or analogous materials of clay minerals, mixtures of fine sand and paraffin, mixtures of sand and sucrose, etc., as well as the use of gels as the carrier material for the seeds has also been known. The method of using gels as the carrier material for the seeds is disclosed, for example, in Japanese Patent Laid-Open Nos. Sho 55-3796 and Sho 54-49807.

That is, the former literature discloses that an aqueous gel is used as the plant growing culture medium or as the stock culture medium in the case of transporting the plants, for supplying water required during growing or transportation of the plants by the water in the gels with no additional supply of water. It is described that clay type gels, natural gels, synthetic organic gels, etc. are suitably used and they may be molded into an appropriate cubic form such as a small bowl or tray. Further, the latter literature discloses hydroculture of paddy rice plants and describes that an aqueous solution of gelatinelike material which is geled upon cooling (for example, an aqueous warmed solution of polysaccharide) is supplied to seeds thereby coating the seeds and maintaining them in a gel layer, as well as that unexpected displacement of seeds can be prevented during cultivation and water required for the germination and growth of the seeds can be supplied from the water in the gel like that in the former case.

Further, Japanese Utility Model Laid-Open No. Sho 56-20409 discloses that water-insoluble hydrophilic gels, for example, grafting products of methacrylic acid and acrylonitrile are suitable as the gel coating material for seeds, and the seeds can directly be coated with these gel materials and molded into various desired shapes such as tablet, pellet, dice, etc. Further, it is also described that the coating gel also serves for the supply of material other than water such as growth hormone, fertilizer, etc.

Furthermore, Japanese Patent Laid-Open No. Sho 48-85311 describes encapsulated seeds in which seeds and powdery nutrient substances are sealed in a easily water soluble capsule.

However, the known seeds coated with conventional coating material or aqueous gel cannot satisfy three factors, that is, water, temperature and oxygen which are generally considered essential as the conditions for the germination of seeds. That is, although only the two factors, i.e., water and temperature can be satisfied, supply of the oxygen is restricted by the aqueous membranes and, accordingly, reduction in the germination percentage cannot be avoided. Although there has been a method of applying dressing, for example, with calcium peroxide ($CaO_2$), for supplying oxygen caused by the chemical change thereof, it causes considerable injury to the plants.

If the seeds are stored in a moistened gel lacking in the oxygen supply for a long period of time, the seeds are swollen and cannot be used at all for the purpose of long time storage. Further, encapsulated seeds using readily water soluble capsules as described in Japanese Patent Laid-Open No. Sho 48-85311 cannot be expected to have a long lasting effect since the capsules are easily washed away upon watering after the sowing and the nutrient substances are also washed away rapidly.

The present applicant has already filed an invention concerning gel-coated seeds coated with an aqueous gel having a plurality of fine pores or air bubbles for the sufficient supply of oxygen required for the germination of seeds. However, since the gel coating is water soluble, there has been a problem that the chemicals such as nutrient substances sealed in the coating layer are liable to be runoff.

As have been described above, gel-coating for plant seeds in general can provide useful advantages on one hand but it requires further countermeasures such as runoff useful substances contained in the coating or the coating per se, or for the lack of oxygen caused by the coating on the other hand.

There may be considered further problems to in the case of such gel coating depending on the kind of plant seeds, particularly, regarding the way of sowing them. Such problems will now be described, for example, for the seeds of paddy rice plant which is one of typical crops plants.

It is customary in Japan that seedlings of paddy rice plant after being grown up to some extent in the nursery bed are transplanted to a paddy field, that is, such a transplantation culture is taken place in about 99% or more of the total rice cropping area in Japan, while direct sowing is employed in about 70% of the rice plant cropping area in other districts of the world.

The method of direct sowing employed at present in Japan is generally classified as below:

(a) Direct sowing in well-drained paddy field.
(b) Direct sowing in flooding water.
(c) Direct sowing in water-flooded soils.

While these methods have advantages in common with them, i.e., manpower saving for seedling and rice planting works, irrespective of the difference in the conditions of paddy field and the depth (position) of sowing, they have many problems respectively.

The driect sowing in the well-drained rice field in (a) above is restricted only to mild climate areas, liable to suffer from the effects of climate conditions or suffers from damages, being eaten by animals and also requires a great amount of service water.

The direct sowing in flooding water in (b) above often causes rotting due to the lack in oxygen depending on the sowing position of rice seeds and turned down seedlings, which reduces the percentage establishment. Further, the rice plants are liable to be lodged upon harvesting period.

The direct sowing in water-flooded soil (c) proposed as the improved culture method for (a) and (b) comprises applying a coating to the seeds of rice plant with a mixture of calcium peroxide and sintered plaster and sowing the coated seeds to a thickness of about 10 mm in the water-flooded soil.

Although oxygen can be supplied to the seed due to the chemical change of calcium peroxide for a long period of time, there are the following problems:

(i) Although calcium peroxide releases oxygen in reaction with water, calcium hydroxide is deposited and contaminates the soils.

(ii) Since the seeds are coated in a rotary drum, while a great amount of seeds can be treated, large external force is applied to the seeds to bring about the breakage thereof.

Further, in the conventional direct sowing in water-flooded soil, since pre-treatments such as selection sterilization and immersion of seeds have been conducted prior to the coating and then the coating has been applied with coating material such as calcium peroxide, it has been extremely laborious upon preparing seeds for use in direct sowing in water-flooded soils.

Particularly, in the direct sowing of coating rice seeds in water-flooded soil, there may be a disadvantage that the seeds do not settle in the soils but come to float up in water if their specific gravity is reduced owing to the coated structure.

SUMMARY OF THE INVENTION

It is, accordingly, a first object of the present invention to provide a method of processing plant seeds and particularly encapsulating each seed in a coating layer together with an air bubble by forming a coating layer excellent in water retainability and air permeability, said water layer having an appropriate hardness while moderately releasing chemicals sealed therein such as nutrient substances and germicides such that it is capable of storing seeds for a long period of time.

The second object of the present invention is to provide a method of processing plant seeds capable of forming a gel coating layer that can provide an optimum seed germination circumstance, particularly, in view of the supply of oxygen and also facilitate the work after the sowing and during storing.

The third object of this invention is to provide a method of processing seeds of rice plant for use in direct sowing in water-flooded soil capable of preventing sown seeds from floating up into flooding water.

In accordance with the present invention, there can be provides a method of processing a seeds of rice plant, which comprises applying a hollow spherical gel coating layer of substantially the same volume together with air bubbles encapsulated therein.

In the present invention, since the seed is protected with the coating material containing nutrient substances, germicide, etc. together with air bubbles, the lack of oxygen can be overcome thereby improving the germination percentage.

BRIEF DESCRIPTION OF THE DRAWINGS

These and other objects as well as advantageous features of the present invention will become apparent by reading the following detailed descriptions for the preferred embodiments according to the present invention, wherein

FIGS. 9A through 9F are, respectively, explanatory views for the method of applying a gel-coating while encapsulating air bubbles and seeds therein.

DESCRIPTION OF PREFERRED EMBODIMENTS

Gel-Coating Method and Pre-treatment

The gel-coating method according to the present invention will be described briefly.

The germination percentage is different due to the absence or presence of dormancy depending on the kind of plants and the germination state is different even for an identical kind of plant due to the difference in the sowing time. Accordingly, pre-treatment has generally been employed for the promotion of the germination. The pre-treatment is conducted while properly selecting, for example, a method of immersing seeds in an aqueous solution of gibberellic acid, seed tester scratching method, high temperature or low temperature treatment, etc, depending on the properties of seeds.

Further, as the pre-treatment other than the germination promotion, chemical treatment has usually been adopted such as with nutrient substances required for the plant growth, for example, potassium nitrate ($KNO_3$), ammonium hydrogen phosphate ($NH_4H_2PO_4$), etc., and, if required, also chemicals such as germicide, insecticide and animal repellent. The chemical treatment can be applied by the following two methods, i.e., the first method of adding these chemicals directly into an aqueous gel by a required amount, and the second method of forming fine voids between the seed and the coating gel into which the chemicals are sealed, or applying a gel coating after previously applying dressing to the seed.

Description will now be made to the method of applying gel coating including the chemical treatment according to the present invention.

In the case of applying the chemical treatment according to the first method, all of the chemicals such as nutrient substances as described above are added in the form of an aqueous solution to an aqueous geling agent, which is then added to purified water at a geling agent concentration from 2 to 4% by weight (hereinafter % means % by weight unless otherwise specified), left for 1 to 2 hours to sufficiently absorb water and get swollen and then stirred to obtain a uniform viscous gel fluid. There are no particular restrictions for the aqueous geling agents usable herein, provided that they have the foregoing properties, and alkali salts of natural gel, synthetic organic gel, inorganic gel, etc. can be used. As a preferred aqueous geling agent, there can be mentioned, for example, sodium alginate and sodium polyacrylate, which can be used with safety since they are non-toxic both to plant and human bodies.

Then, the resultant viscous gel fluid is processed, for example, by using a mold or a nozzle as described later.

Figure 1:
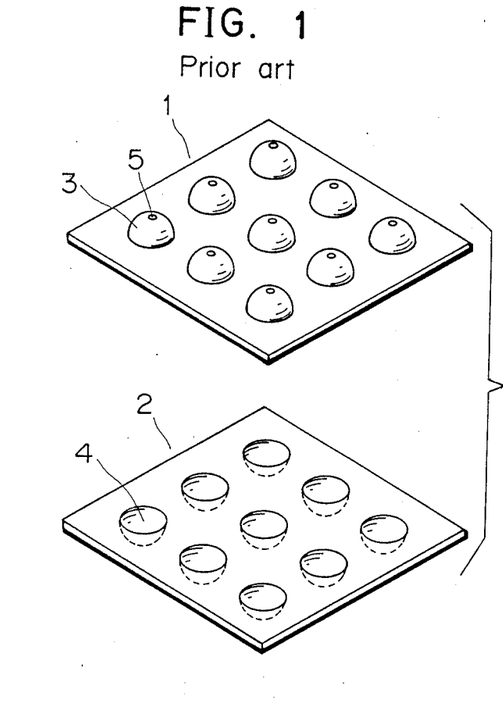
FIG. 1 is a perspective view for a mold used for applying a gel coating by a method conceived of by the inventor prior to the present invention.
Figure 2:
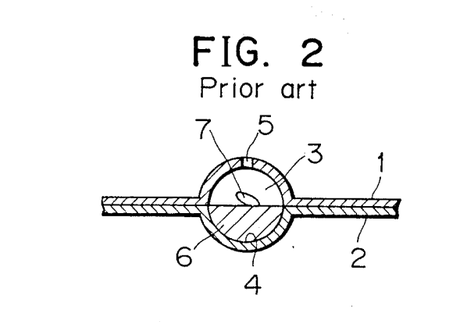
FIGS. 2 and 3 are, respectively, explanatory views for applying the gel coating by using the mold shown in FIG. 1.
Figure 3:
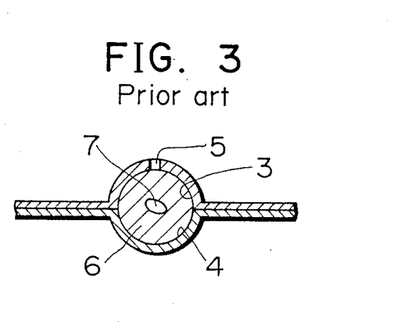

As shown in FIG. 1, a mold used in a method which the inventor conceived prior to the invention comprises an upper mold 1 and a lower mold 2 made of a thick-plate material, in which a plurality of semi-spherical recesses 3 and 4 are formed opposed to each other in each of the mold halves, so that each pair of the upper and lower recesses 3 and 4 constitutes a complete spherical recess when over-laid with each other. Further, a small aperture 5 of about 1–2 mm diameter is opened at the center of the recess 3 of the upper mold 1 passing through the upper surface of the mold. The gel fluid as described above is at first poured into the recess 4 of the lower mold 2. Then, as shown by the pair of the recesses 3 and 4 in cross section of FIG. 2, from one to two grains of seeds 7 (the number of grains are determined depending on the germination percentage of plant) are set at the central portion of the upper surface of the poured gel fluid 6, over which the upper mold 1 is covered. Then, the gel fluid 6 is poured to fill the inside of the recess 3 from the small aperture 5 of the upper mold 1 by using an injection needle or the like to thereby obtain a spherical gel product in which the seed 7 is encapsulated at the central portion thereof as shown in FIG. 3.

Then, the resultant seed-encapsulating spherical gel product is immersed and left in an aqueous solution of divalent or trivalent metal salt. As the aqueous solution of divalent or trivalent metal salt used herein, there can be mentioned an aqueous chloride solution of divalent metal such as calcium, magnesium and barium or an aqueous solution of aluminum chloride. Further, the aqueous metal salt solution is adjusted to about 10% to 50% by weight. Water containing not much metal ions is preferred as the medium water. The spherical gel product immersed in the aqueous metal salt solution described above conducts replacement between the alkali metal (for example, Na) of the aqueous geling agent and the divalent or trivalent metal (for example, Ca) and causes chemical change and turns from the surface thereof into a water-insoluble substance having extremely fine pores also in optical point of view. The water insolubilization is completed for the entire aqueous gels coating over the seed after elapse of a few minutes.

Figure 4A:
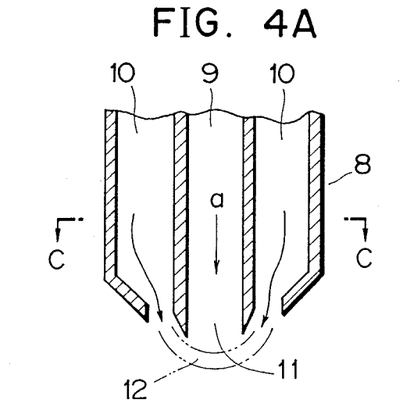
FIG. 4A is a partly cut-away vertical cross sectional view for a portion of a nozzle used upon applying a gel coating according to the present invention.
Figure 4B:
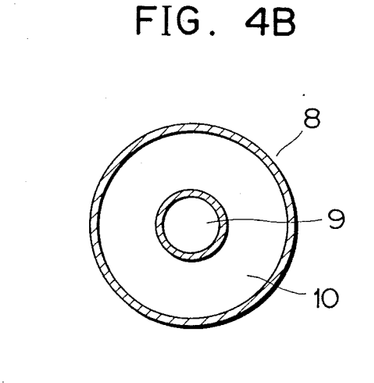
FIG. 4B is a cross sectional view taken along line C—C.

Then, in order to ensure that an air bubble is encapsulated together with a seed, a nozzle 8 as shown in the partially cut-away longitudinal cross sectional view in FIG. 4A and by the cross sectional view in FIG. 4B taken along line C—C in FIG. 4A is used.

The nozzle 8 comprises a central channel 9 and an annular channel 10 narrowed at the tip end thereof and formed to the outer circumference of the channel 9, in which the central channel 9 constitutes a drop passage for the seed, while the annular channel 10 constitutes a flow channel for the gel fluid. The nozzle 8 is attached to any known extruder main body (not illustrated).

The gel fluid as described above is flown downwardly from the extruder main body in the direction of the arrow a, joins to each other near the tip end 11 of the nozzle 8 and forms a hollow semi-sphere 12. In this instance, from 1 to 2 grains of seeds are dropped passing through the central channel 9 into the semi-sphere 12. Then, as the gel fluid is further extruded, it forms a seed-encapsulating spherical gel product due to its own weight and the surface tension and falls spontaneously. The diameter for the spherical gel product can optionally be adjusted to a practical size of less than about 15 mm by adjusting the size of the opening at the tip end of the nozzle 8. The spontaneously fallen seed-encapsulating gel product is rendered insoluble to water by the procedures as described above.

While explanation has thus been made for the case of adding chemicals such as nutrient substances in the form of an aqueous solution to the gel, chemical dressing of the seed surface will be explained next in which powdery chemicals are coated as they are.

In this case, the processing using the nozzle as described above is suitable. That is, at the stage where the gel fluid is formed into a semi-spherical shape at the tip end of the nozzle, chemical powder, seed and chemical powder are supplied in this order passing through the central channel 9 and by the similar subsequent processing, a seed-encapsulating spherical geling product having chemical dressing at the periphery of the seed can be obtained.

The seed-encapsulating spherical gel product rendered water insoluble by the processing steps as described above can be served as it is for the sowing after sufficient water washing, but freeze drying treatment is applied if it is necessary to store the seeds up to a seeding time. The freeze drying treatment is conducted by using a known freeze drying device at a freeze temperature from $-20°$ C. to $-90°$ C. and under a reduced pressure of below about 5 Torr.

In accordance with the method according to the present invention, the seed encapsulated in a gel coating is exposed to the air bubble also encapsulated therein, thus it is kept being supplied with sufficient oxygen.

Description will be made one embodiment of the present invention in which air bubbles are encapsulated in contact with the surface of seeds by using the aqueous gel applied with chemical treatment as described in the foregoing.

FIGS. 5A through 5E illustrate the production step by a nozzle using a plunger.

Specifically, said figures show a nozzle A comprising a hollow cylinder 13 having a hollow portion 13a in communication with a gel flow channel 16 in which a gel pressurizing plunger 14 substantially of a cylindrical shape and a gel cutting plunger 15 having a seed passing channel 15a at the central portion in a double structure.

Figure 5A:
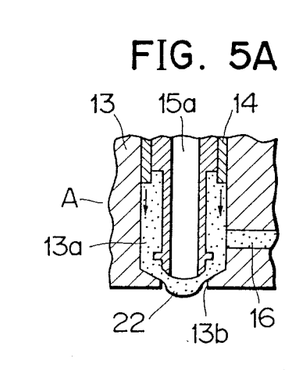
FIGS. 5A through 5E are, respectively, explanatory views for the production method of a gel-coated seed according to the present invention.
Figure 5B:
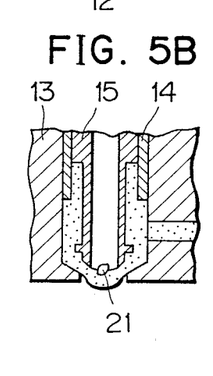
Figure 5C:
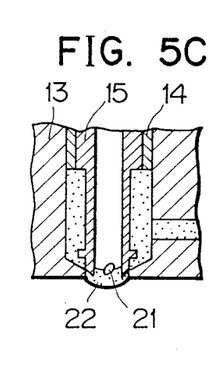
Figure 5D:
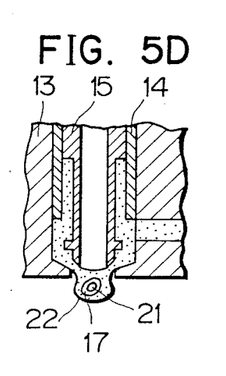
Figure 5E:
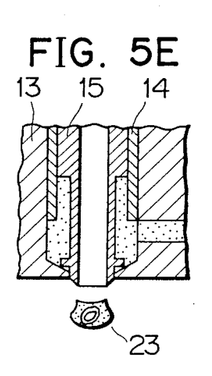

Referring to the operation of the nozzle A, the pressurizing plunger 14 is at first elevated forcibly, with the nozzle aperture 13b of the cylinder 13 being closed by the gel cutting plunger 15 thereby filling a gel 22 through the gel flow channel 16 to the inside of the hollow portion 13a of the cylinder 13 (initial gel charging is not illustrated). Then, as shown in FIG. 5A, when the pressurizing plunger 14 is lowered, the gel in the hollow portion 13a is pressurized, thereby urging the plunger 15 upwardly and opening the nozzle aperture 13b to release the gel 22. At a stage when the gel 22 is released by about one-half of the required amount, a seed 21 is caused to fall through the seed passing channel 15a (FIG. 5B). Upon falling the seed 21, urging to the plunger 14 is interrupted to return the plunger 14 is to the initial position by spring or like other means not illustrated. Thus, the gel is filled in the cylinder hollow portion 13a in an amount corresponding to that has been released. Further, since the plunger 15 is free from the pressure by the gel, it goes downwardly to close the nozzle aperture 13b. However, the gel 22 and the seed 21 are adhered to the nozzle aperture 13b. Since the gel 22 slightly sags by its own weight, voids (air bubbles) formed by the intrusion of air is resulted at the periphery of the seed 21 (FIG. 5C). Then, when the pressurizing plunger 14 is again depressed as shown in FIG. 5D, the nozzle aperture 13b is opened like that in the case of FIG. 5A, and the seed 21 is coated with the gel 22 in a state where the air bubble 17 is encapsulated at the periphery of the seed 21. When a predetermined amount of the gel 22 is extruded out of the cylinder hollow portion 13a, the pressure exerted on the plunger 15 is lost and the plunger 15 goes downwardly to close the nozzle aperture 13b. In this state, a gel-coated seed 23 is detached from the nozzle aperture 13b and then falls by its own weight (FIG. 5E). The fallen gel-coated seed 23 is formed into a spherical shape due to the surface tension of the gel during falling and then poured into a water-insolubilizing liquid not illustrated.

Figure 6A:
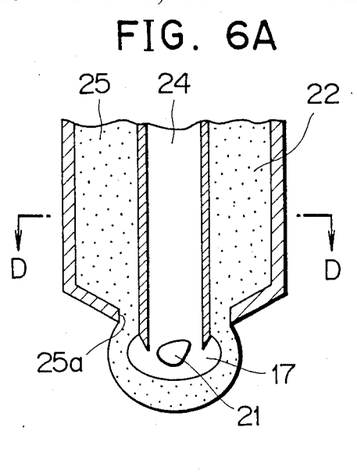
FIG. 6A is an enlarged view for said production method for the gel-coated seed according to the present invention.
Figure 6B:
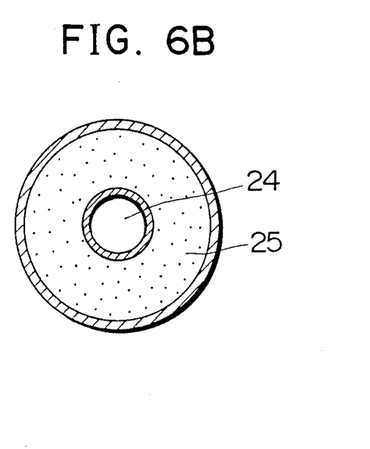
FIG. 6B is a cross sectional view taken along line D—D in FIG. 6A.

While descriptions have been made to the method of producing the gel-coated seed-encapsulating gas bubbles therein by way of a nozzle A using the plunger, such a seed can also be produced by using a nozzle B as shown by the cross section in FIG. 6A and by the cross section in FIG. 6B taken along line D—D of FIG. 6A. Specifically, the nozzle B comprises an annular gel flow channel 25 restricted at its tip end, formed to the outer circumference of a seed air supply channel 24, in which the gel flow channel 25 is connected with an existent extruder, while the seed air supply channel 24 is connected with air supply means such as of an air compressor. Gel 22 is extruded by way of an extruder from the nozzle aperture 25a at the lower end of the gel flow channel 25, and, at a stage where the gel 22 is formed substantially in a spherical form through a nozzle aperture 25a and a seed 21 is forcibly sent together with air bubbles 17 to the central portion thereof. Then, when the gel is released further, the gel-coated seed falls by its own weight and then drops into the water insolubilizing solution in the next step.

As the water-insolubilizing treating solution for the gel-coated seeds, an aqueous salt solution of divalent or trivalent metal is suitably used.

As the aqueous metal salt solution, there can be mentioned an aqueous chloride solution of divalent metal such as calcium, magnesium and barium, or an aqueous chloride solution of trivalent metal such as of aluminum. Further, the aqueous solution of the metal salt is adjusted to about 20% by weight. Water containing not much metal ions is preferred as a water for the solvent.

The gel-coated seed immersed in the aqueous solution of metal salt conducts replacement therein between the alkali metal of the aqueous gelling agent (for example, Na) and divalent or trivalent metal (for example, Ca) causes chemical change and turns from the surface thereof into a water-insoluble material having extremely fine pores also in an optical point of view, by which the coated surface layer is hardened by about one minute to produce a coated seed of highly elastic and possesses its geled state in the inside.

Figure 7:
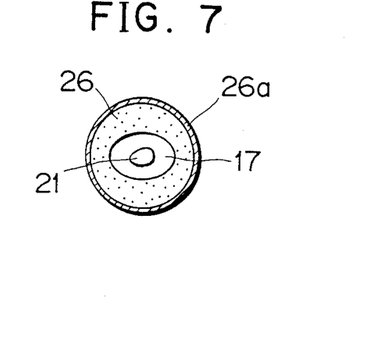
FIG. 7 illustrates a gel-coated seed in cross section produced by a nozzle of FIGS. 6A and 6B.

FIG. 7 schematically illustrates the cross sectional view of the gel-coated seed according to this embodiment obtained in this way. In the figure, are shown a seed 21, not-cured gel layer 22, cured gel layer (water insolubilized) 22a and air bubbles 17.

In the case of the second method as described above, that is, where chemicals such as nutrient materials are sealed between the seed and the coating gel, it can be processed by sealing the chemicals together with the seed or sealing them in a state where the seed is dressed in the same procedures as described above.

The gel-coated seed obtained by the production process as described above can be served as it is for the sowing after sufficient water washing, but drying treatment, preferably, freeze drying is applied if it has to be stored till the sowing time. The freeze drying treatment is conducted by using a known freeze drying device, in which the drying product is at first subjected to preliminary freezing at a temperature about $-20°$ C., thereby preventing the bursting of the air bubbles under a reduced pressure. Then, drying was conducted at a drying temperature of from $-20°$ C. to $-90°$ C. and under a reduced pressure below about 5 Torr. such that the gel layer contains 3 to 4% water.

In the case of drying a great amount of seeds, alcohol or like other evaporizing liquid may be used instead of water as the solution for the gel, by which selective drying of evaporizing the solvent at low temperature without damaging the life of the seed can be conducted.

In accordance with this embodiment, gel-coating can provide the following merit in addition to those various merits as described in the previous embodiment:

Since gas bubbles are contained to the inside of the coating layer in contact with the surface of the seed, it can cope with the demand for a great amount of oxygen required for the seed accompanying with the temperature rise in the summer season, and reduction in the germination percentage due to the lack of oxygen can be avoided.

Finally, the method of coating the seeds of rice plant for use in direct sowing in water-flooded soil will be explained below while referring to another embodiment shown in FIGS. 8 and 9A through 9E.

The processing method is substantially same as in the previous embodiment. However, special consideration is applied in this case so that the gel-coated seed of rice can be seeded directly in water-flooded soil.

That is, since the seeds of rice plant for use in the direct sowing in water-flooded soil have been prepared by applying coating containing calcium peroxide after conducting pre-treatment such as sterilization or seed soaking prior to the coating, the preparation has been extremely laborious. The pre-treatment and the coating are simultaneously conducted also in this example taking notice of the fact that pre-treatment such as sterilization or seed immersion is possible by adding germicide or germination promotor in the coating material, and gel is used for the coating agent for enabling various kinds of chemicals to be added.

Further, water insolubilization of the gel coating material such as CMC—Na, sodium polyacrylate, sodium alginate, etc. with an aqueous solution containing divalent or trivalent metal salt, i.e., metal ions, e.g., $Ca^{2+}$ is also conducted as in the previous embodiments. Furthermore, the method of encapsulating air bubbles together with the seed of rice plant in the gel coating layer as in the previous embodiment is also employed in this embodiment.

A specific method of encapsulating air bubbles together with the seeds to the inside of a gel coating layer is shown in FIGS. 9A through 9E.

In the drawing, a nozzle main body 31 has a cylindrical plunger insertion aperture 32 passing therethrough in the vertical direction and a cylindrical cutting plunger 33 is fitted into the plunger insertion aperture 32. More particularly said cylindrical cutting plunger 33, has a cylindrical large diameter piston section at an upper portion thereof to be fitted in said cylindrical aperture and a small diameter valve section to define an annular space therearound within said cylindrical aperture. Said cylindrical cutting plunger 33 is further bored with a central channel therethrough.

The plunger insertion aperture 32 is formed with a tapered valve seat 34 of a diameter reduced downwardly toward the lower end and also formed with a gel flow channels 35 on each of the right and left sides.

The cutting plunger 33 is biased downwardly by means of an urging member such as a spring (not illustrated) and the valve 33a at the lower end of the small diameter valve section closes the valve seat 34. In a case where the pressure of the gel filled in a gel flow channel 35 and the plunger insertion aperture 32 is increased, a pressure receiving portion 33b in the form of a stepped portion formed by the large diameter piston section and the small diameter valve section of the cutting plunger 33 is elevated under pressurization by which the valve 33a causes the valve seat 34 to define an annular opening thereat.

Figure 9A:
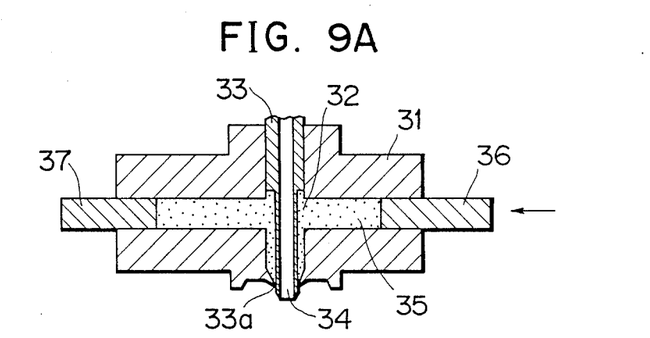
Figure 9B:
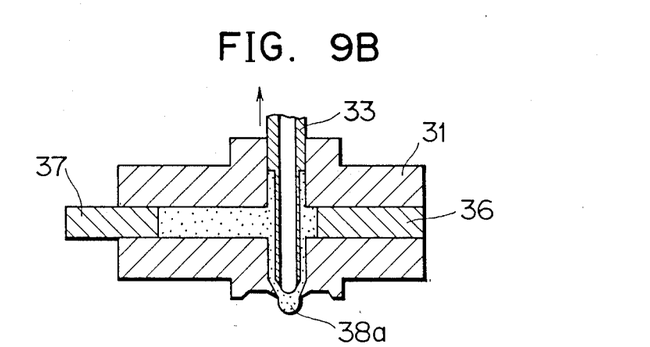

Cylinders (not illustrated) are disposed to the left and right in the nozzle main body 31, and pistons 36, 37 for the cylinders are retractably inserted into the gel flow channel 35 (refer to FIG. 9A). When the piston 36 advances into the gel flow channel 35 from such a state where the cutting plunger 33 pressurized at the pressure receiving portion 33a is elevated, by which the valve 33a causes the valve seat 34 to open thereby discharging the gel 38 charged in the annular aperture (refer to FIG. 9E).

Then, when the piston 36 is retracted, the pressure in the gel flow channel 35 becomes negative, by which the gel is supplemented from a lead valve (not illustrated) and the cutting plunger 33 goes downwardly, by which the valve 33a causes the valve seat 34 to close. In this case, although the gel 38 discharged from the valve seat 34 forms a membrane which is allowed to sag in the central portion by its own weight, it does not fall gravitationally due to the adhering force but forms a hollow semisphere having a central chamber communicating with the central channel in the cutting plunger 33.

Figure 9C:
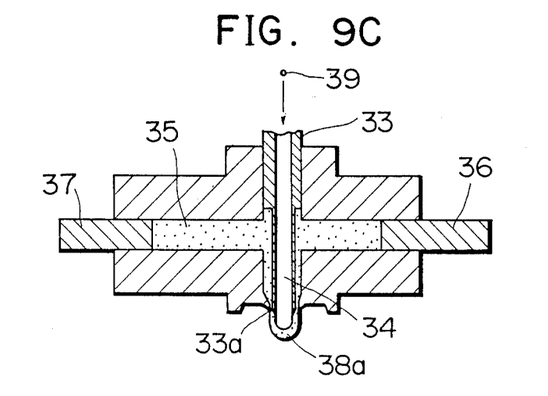

In this case, a seed 39 is fallen and supplied from above through said central channel (refer to FIG. 9c).

Figure 9D:
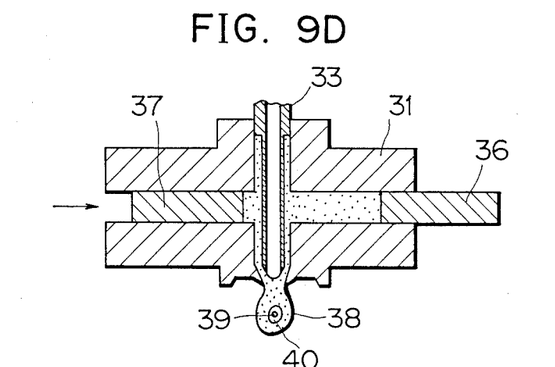

Then, the piston 37 is advanced to the inside of the gel flow channel 35 and the valve 33a again leaves the valve seat 34 to release the gel 28, by which the seed 38 is tightly encapsulated together with air bubbles 40 in the gel 38 (refer to FIG. 9D).

Figure 9E:
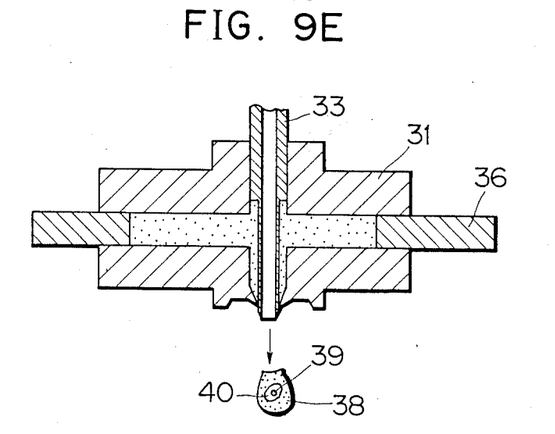

Then, when the piston 37 is retracted and the valve 33a closes the valve seat again, the sagging gel 38 can no more sustain its increased weight and falls into the curing solution in a curing solution tank below, during which the gel takes a spherical shape by the surface tension (refer to FIG. 9E).

Figure 8:
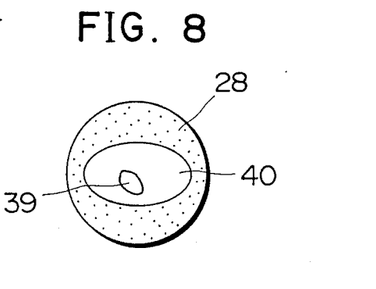
FIG. 8 illustrates a gel-coated seed having an air bubble in cross section according to the present invention.

In this way, a gel coating layer 28 for the seed 39 tightly encapsulating therein air bubbles 40 is completed as shown in FIG. 8, in which the size of the gel-coated seed is 10 mm in diameter.

The thus prepared gel-coated seed is dropped into a bath of an aqueous solution of divalent or trivalent metal salt. The concentration of said solution varies from 10 to 50% by weight though the inventor has found that 20% by weight concentration is most preferable. Said gel coated seed is immersed at least for one minute and taken out to be washed in water. It may further be subjected to a preliminary freezing at −20° C. and then a dry freezing at from −20° to −90° C. under a reduced pressure below about 5 Torr.

While a larger size seed requires a greater amount of oxygen upon germination, oxygen for the germination of the rice plant seed is required only for the period from the germination of the rice plant seed to the emergence of the first true leaf and, accordingly, air bubbles in an amount required therefor may be encapsulated together with the rice plant seed within the gel. However, if the coated seeds including air bubbles are seeded in a paddy field, it brings about a problem that the seeds come to float in flooding water.

The coated seeds having air bubbles encapsulated therein may be sunk into the soils of the paddy field by making the apparent specific gravity of the coated seeds to greater than one and the dissolving means can include the following two methods:

(1) Increasing the concentration of the coating gel, and (2) adding the specific gravity increasing material such as fine sand while leaving the concentration of the coating gel as it is like that in the conventional case.

Description will be made below for the specific gravity increasing test in a case where the specific gravity increasing material is added.

It is required that the materials usable as the specific gravity increasing material be non-toxic both to plant and soil bodies and they should, as a rule, be agricultural materials.

Under the conditions as described above, experiment was conducted for the following specific increasing materials:

(a) pulverizates of solid fertilizer,
(b) pulverizates of culturing sand,
(c) hydroball pulverizates for use in hydroculture,
(d) pulverizates of "KANUMA" soil,
(e) pulverizates of "AKADAMA" soil.

Since the foregoing specific gravity increasing materials, if water soluble, cannot be used as such material, the water solubility and the specific gravity for the respective specific gravity increasing materials are shown below.

| Solid fertilizer | Rainbow sand | KANUMA soil | AKADAMA soil | Hydro Ball |
|---|---|---|---|---|
| Slight soluble | insoluble | insoluble | insoluble | insoluble |
| 3.18 g/cm$^3$ | 2.78 g/cm$^3$ | 2.50 g/cm$^3$ | 3.13 g/cm$^3$ | 3.33 g/cm$^3$ |

From the foregoing result, any of the specific gravity increasing materials described above can be used. In the case of adding the pulverizates of solid fertilizer, however, since the salt concentration in the coating material is increased, it is not appropriate because there is a great possibility of causing salt injuries to the seeds.

Further, if calcium is present in the specific gravity increasing material, it may possibly harden the gel. The gel-resistant property for each of the specific gravity increasing materials is as follows:

| Solid fertilizer | Rainbow sand | KANUMA soil | AKADAMA soil | Hydro Ball |
|---|---|---|---|---|
| A hardened | B not hardened | C not hardened | B not hardened | C not hardened |

Symbols in the table:
A : Aggregate structures are formed and not dispersed uniformly in the gel.
B : Particles are aggregated gradually and dispersed in the gel.
C: Fine particles are dispersed as they are in the gel.

From the result of the above test, it has been confirmed that although the solid fertilizer cannot be used as the specific gravity increasing material, materials may be used as such and can make the apparent specific gravity of the coated seed to greater than 1.

However, since the bonding strength of the gel is reduced if the specific gravity increasing material is added in a great amount, the gel concentration has to be increased somewhat for increasing the specific gravity not by the mere addition of the specific gravity increasing material.

As has been described above, by the method of the preferred embodiment in this embodiment, direct seeding of air bubble-encapsulating gel-coated seeds in water-flooded soils has been enabled by adjusting the specific gravity of the gel coating layer.

The embodiment can provide, in addition to the similar advantages as described for the previous examples, the following advantageous effect.

Since the specific gravity increasing material is incorporated into the gel coating material, the apparent specific gravity of the gel coating material can be made greater than 1 and, accordingly, the air bubble-encapsulating gel-coated seeds can surely be cultured in water-flooded soils.

What is claimed is:
1. In a method of processing a plant seed wherein a coating treatment is applied to a plant seed with an aqueous alkali salt solution of an aqueous gel to form a coating layer thereon and said coating layer is reacted with an aqueous solution of a divalent or trivalent metal salt to render said coating layer insoluble to water, the improvement comprising the steps of
  (a) preparing a nozzle including a nozzle body formed with a cylindrical aperture vertically formed therein and a cylindrical cutting plunger inserted in said cylindrical aperture, said cylindrical cutting plunger having a large diameter piston section at an upper portion thereof to be slidingly fitted in said cylindrical aperture and a small diameter valve section to define an annular space therearound within said cylindrical aperture, said large and small diameter sections forming a stepped portion therebetween, said cylindrical aperture having a reduced diameter at a lower end thereof to form a valve seat for the small diameter valve section to rest thereat, said cylindrical cutting plunger having a central channel bored therethrough:
  (b) charging said annular space with said aqueous alkali salt solution of an aqueous gel;
  (c) pressurizing said charged solution to exert a pressure on said stepped portion such that said cylindrical cutting plunger is raised to move away from said valve seat and to define an annular opening thereat and that said charged solution flows out said annular opening:
  (d) reducing the pressure of the solution within the annular space to cause the raised cutting aperture to descend such that the small diameter valve section closes the valve seat while allowing said flowing out solution to sag to form a hollow part having a central chamber in communication with said central channel;
  (e) dropping a plant seed through the central channel onto said central chamber;
  (f) pressurizing again said charged solution to raise the cylindrical cutting plunger and open the valve seat such that the solution is discharged to close the central chamber, thus encapsulating said dropped plant seed with an air bubble therein; and
  (g) reducing the pressure of the solution within the annular space to cause the raised cutting plunger to descend such that the small diameter section closes the valve seat to cut off said encapsulated plant seed from the charged solution within the annular space.
2. A method according to claim 1, further including a step of (h) subjecting said encapsulated seed to aqueous solution of divalent of trivalent metal salt subsequent to the steps (a) to (g).
3. A method according to claim 2, further including a step of (i) freeze drying the encapsulated seed subsequent to the step (h).

* * * * *